United States Patent

[11] 3,621,975

| [72] | Inventor | Erik O. Vilen<br>Niles, Ill. |
|---|---|---|
| [21] | Appl. No. | 249 |
| [22] | Filed | Jan. 2, 1970 |
| [45] | Patented | Nov. 23, 1971 |
| [73] | Assignee | Triangle Package Machinery Company<br>Chicago, Ill. |

[54] INDEXING APPARATUS FOR PACKAGE CONVEYOR
17 Claims, 16 Drawing Figs.

[52] U.S. Cl. .................................................. 198/34,
198/26
[51] Int. Cl. .......................................... B65g 47/26,
B65g 47/42
[50] Field of Search........................................ 198/26, 34, 21

[56] References Cited
UNITED STATES PATENTS

| 3,024,890 | 3/1962 | Belk ............................. | 198/34 |
| 3,344,903 | 10/1967 | Holm............................. | 198/127 |
| 2,576,369 | 11/1951 | Sticelber ....................... | 198/26 X |
| 2,762,487 | 9/1956 | Temple .......................... | 198/34 X |

*Primary Examiner*—Edward A. Sroka
*Attorney*—Johnston, Root, O'Keeffe, Keil, Thompson & Shurtleff ABSTRACT: A plurality of packages are moved in a line by a conveyor to a station where some suitable operation is performed thereon, such as being moved by a pusher member to a further station. A gate is interposed in the path of movement of the packages to stop movement thereof temporarily toward the station. Pressure of the package against the gate, moves a part of it into the path of a reciprocating member which removes the gate from the path of the packages to allow the first package in the line to move to the station. This first package is caused to move at an increased rate of speed from the gate to the station to allow the gate to return to its normal position in the path of the next-succeeding package.

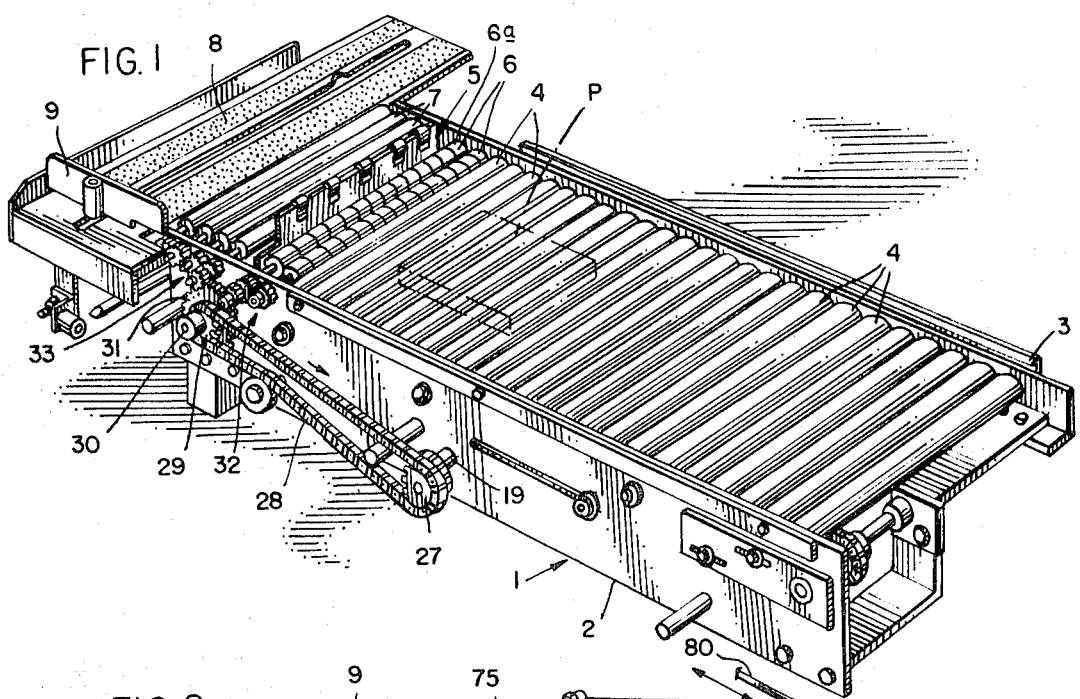
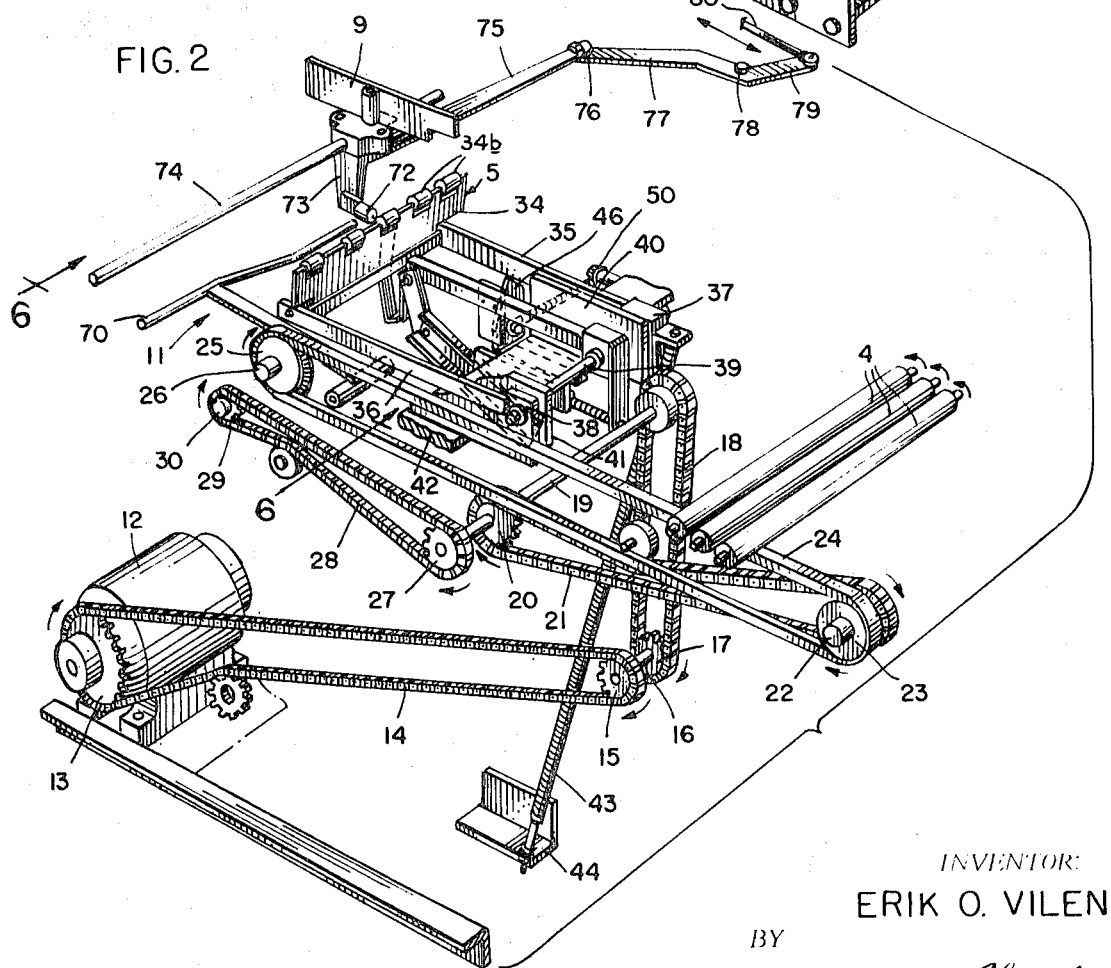

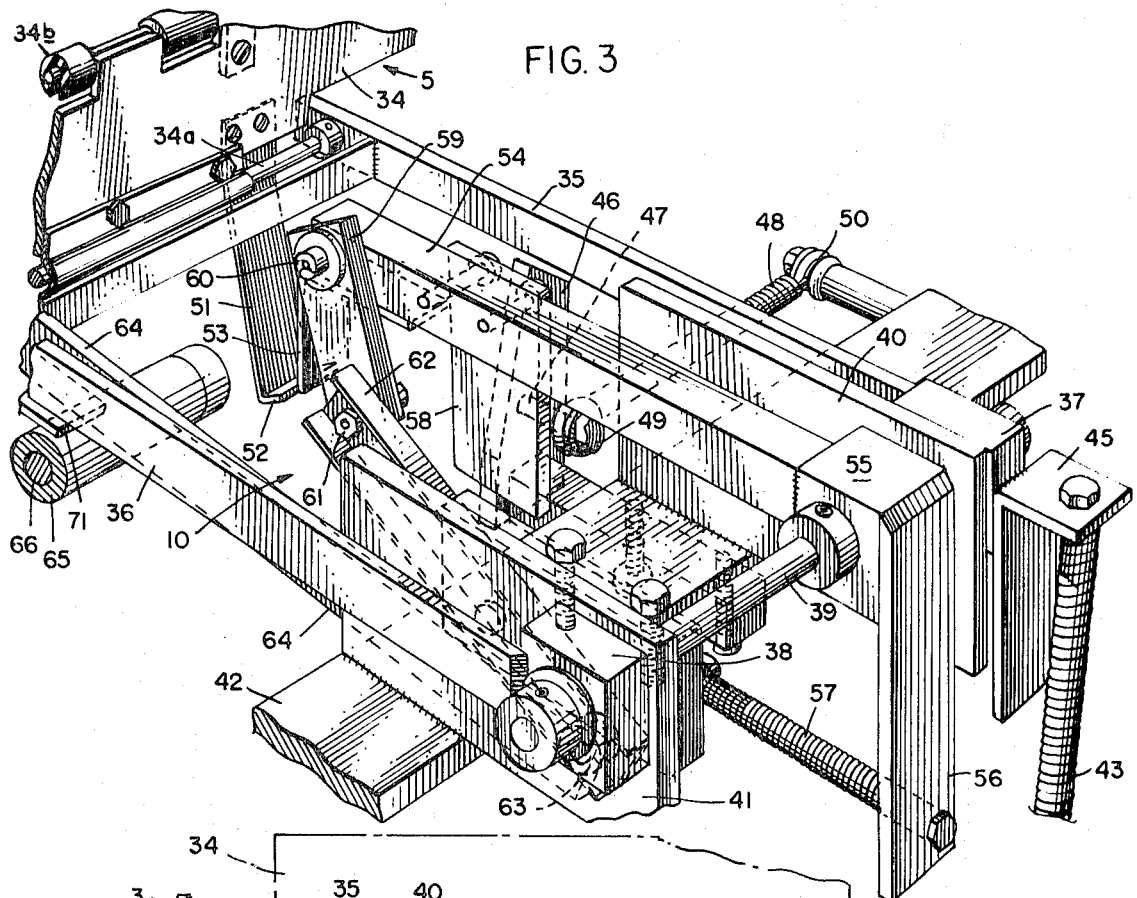
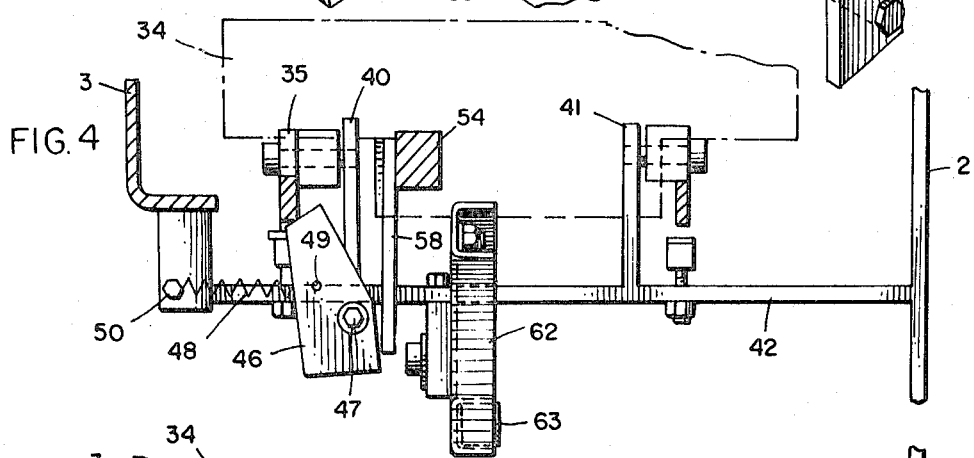
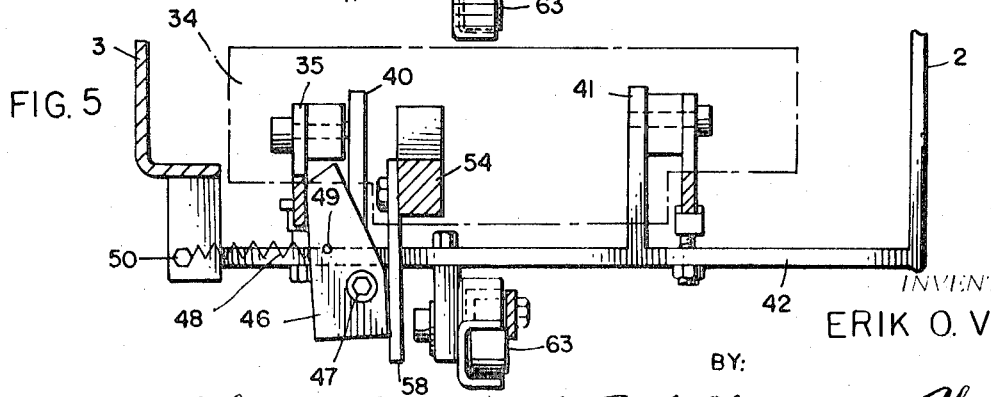

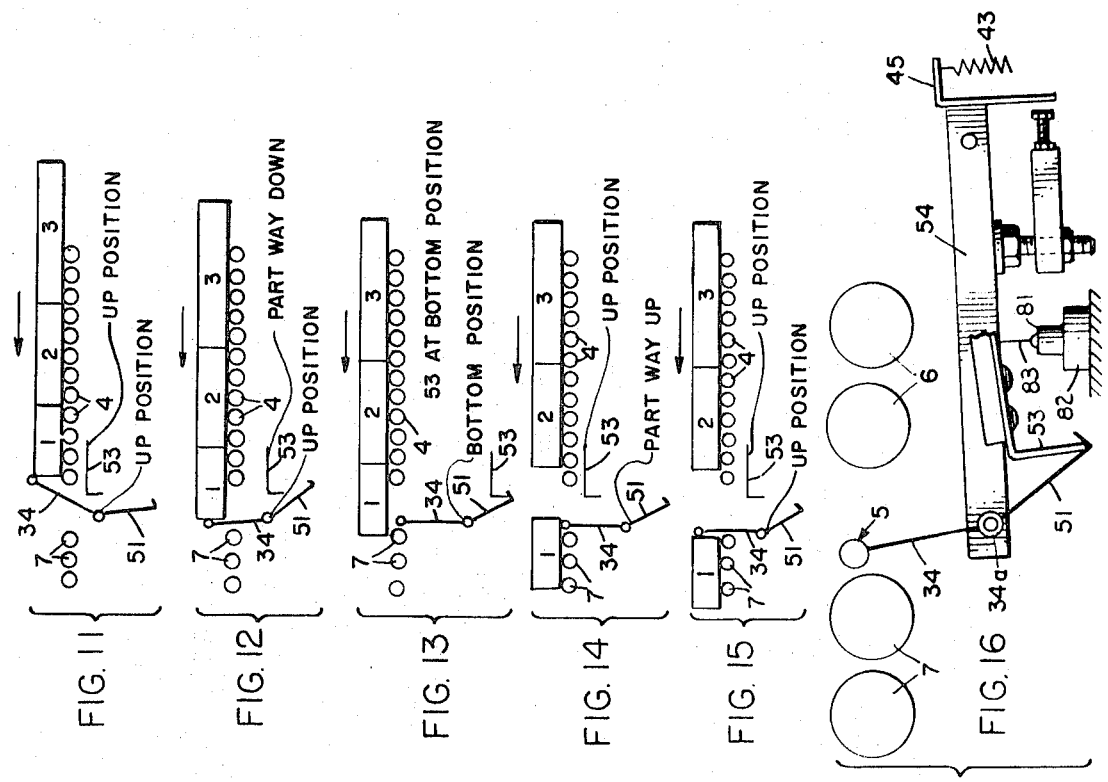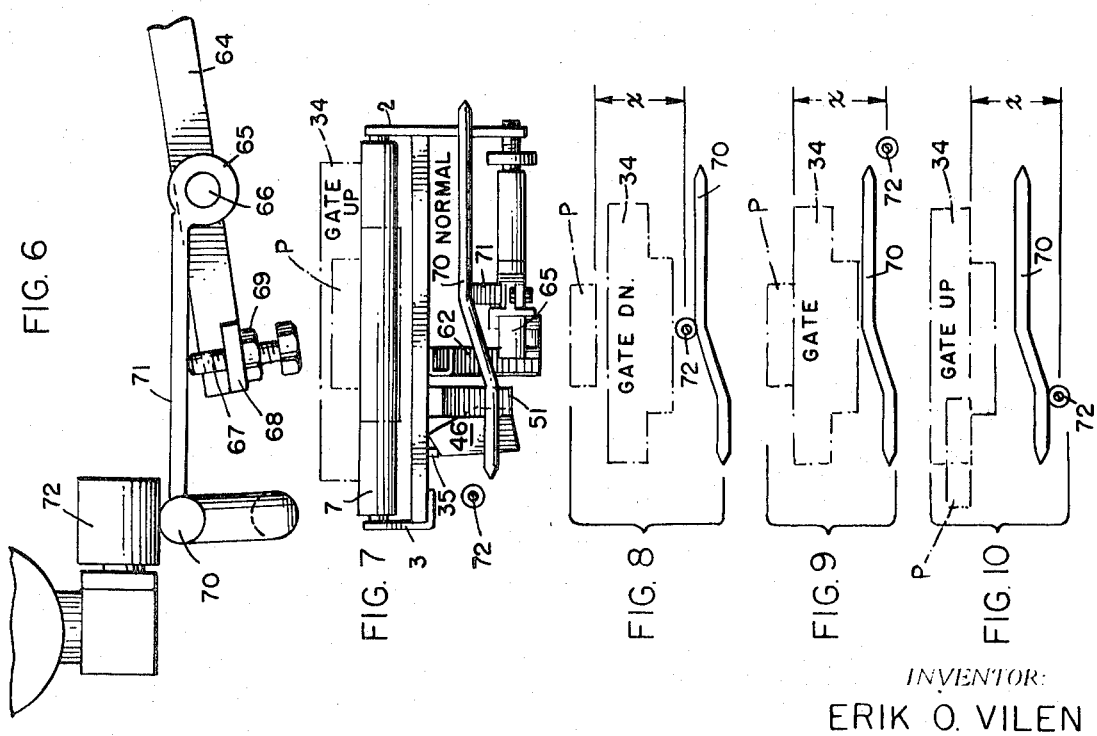

INDEXING APPARATUS FOR PACKAGE CONVEYOR

BRIEF SUMMARY OF THE INVENTION

The invention relates generally to an indexing apparatus which may be utilized for the purpose of moving packages one at a time from a line of packages to a station from which it may either be removed or at which it may have some operation performed thereon. In actual practice the apparatus of the present invention has been used in connection with a package-wrapping machine, although it will be evident that the use of the apparatus need not be so limited since the packages may be delivered to a station either for removal by hand, or for manual wrapping, or movement to another station, or for having some other suitable operation performed thereon, such as labelling.

Packages are caused to be moved by conveyor means in a line toward a station, but interposed in the path of movement of the packages there is provided a stop member against which the lead package of the line may come against to stop movement of the packages temporarily until there is a demand for a package. The stop means is caused to be removed from the path of the packages in properly timed relation, to allow the leading package to advance to the station, after which time the stop means will return to its normal position again halting the movement of the packages temporarily until there is another demand for a package.

As specifically disclosed herein, for illustrative purposes only, a pusher member transfers the package from its station in a direction which is transverse to the movement of the conveyor and the packages thereon. When the present apparatus is used in conjunction with a package-wrapping machine the pusher member transfers the package to a second station where the package then advances through various steps during which it is wrapped. During the return stroke of the pusher a "demand" will be made for another package, by mechanical means, and if a package is at the stop member, it will be advanced to its station.

Since the present apparatus is capable of use in connection with other machines, or by itself, it is immaterial what operation is performed upon the package after it is delivered from the conveyor means, or by what means a demand for the next package is made. If there is an operator who manually removes the package from its station, he could manually press a button or close a switch to complete an electrical circuit which had previously been made "ready" by the presence of a package against the stop means. If mechanical means are used to remove the package from the station, the operation thereof could either complete an electrical circuit or operate a mechanical actuating device for removing the stop means and permit advancement of a package. In any event there must be a package present at the stop means where a demand is made or the stop means will not move.

Other apparatus could also be used to detect or sense the presence of a package at the stop means. For example an electric eye could sense the leading edge of a package at the stop means, and "ready" a circuit which would be completed by manual or mechanical means, creating the demand which would remove the stop means from the path of the package.

A feature of the invention involves the creation of a space between the leading package and the next-succeeding one by rapid advancement of the leading package in the line from the stop means to its station at a speed which is greater than the speed of movement of the packages on the conveyor, so that the stop means may immediately be returned to its normal position in the path of movement of the packages to stop movement thereof temporarily until another demand for a package has been made.

Packages have been advanced, in a package-wrapping machine, by a conveyor which operated intermittently. Another method has been to advance packages continuously, but they had to be spaced apart a sufficient distance to allow an operation to be performed on one package before the next one arrived. This made it necessary to provide a rather long conveyor to accommodate a given number of packages because they had to be spaced apart a predetermined distance. The present apparatus allows packages to be conveyed in contacting relationship, if desired, thereby enabling a much greater number of packages to be moving at the same time, and on a shorter conveyor, than has heretofore been possible.

Furthermore, the apparatus for imparting an intermittent movement to the conveyor had to be relatively complicated, and, of course, a greater mass was involved than in the present instance where a line of packages can be in contact with each other and no "stop and start" mechanism is necessary. In the present invention a continuously driven friction drive for the conveyor rollers merely slips when the stop means is in the path of the line of packages, and they are conveyed one at a time when the stop means is removed.

Having the foregoing in mind, it is therefore a principal object of the present invention to provide a novel form of indexing apparatus for moving packages one at a time from a line of packages to a station.

Another object of the invention is to provide an indexing apparatus wherein movable stop means are normally positioned in the path of a line of moving packages, and wherein novel operating mechanism removes the stop means from said path, to allow the leading package of the line to advance to a station, and promptly returns the stop means to its normal position immediately after movement of a package past it to prevent advancement of the next package in the line until a demand has been made for it.

A further object is to provide novel conveyor means in connection with a package-indexing apparatus, wherein a space between the leading package of a line of packages and the next-succeeding package is created by advancing the leading package at an increased speed from a predetermined position on the conveyor to its station.

A still further and more specific object of the invention is to provide a novel conveyor mechanism, in connection with a package-indexing apparatus, wherein a plurality of conveyor rollers are driven by friction means, so that when a line of moving packages is momentarily stopped while a previous package is having an operation performed thereon, the drive means will slip and thereby prevent packages from climbing over each other.

Another important object of the invention is to provide an indexing apparatus wherein packages of random length may be advanced one at a time to a station.

Still another object of the invention is to provide an indexing apparatus wherein stop means, normally positioned in the path of movement of a package and against which a package may be moved, is caused to move out of the path of the package in response to a demand, and remain out of the path until the trailing edge of the package has passed the stop means regardless of the length of the package.

Still another object of the invention is to provide an indexing apparatus wherein the leading edge of a package moving toward a station is sensed when it reaches a stop device which stops further movement thereof until a demand for a package is made, whereupon the stop device is removed from the path of the package to allow it to continue to its station, and wherein the trailing edge of the package is sensed as it moves past said stop means, thereupon returning the stop means to its original position.

Other objects and advantages of the invention will become apparent upon reading the following description taken in conjunction with the accompanying drawings, in which FIG. 1 is a perspective view of one form of the indexing means and conveyor embodying the present invention;

FIG. 2 is a fragmentary perspective view of the drive means for the conveyor and the operating mechanism for other parts of the indexing apparatus;

FIG. 3 is a fragmentary perspective view on an enlarged scale of one embodiment of the apparatus for actuating the stop means;

FIG. 4 is a fragmentary transverse view partly in elevation and partly in section of the stop-means-actuating mechanism looking toward the right from the left-hand end of FIG. 3, and showing the stop means locked in its upper position;

FIG. 5 is a view similar to FIG. 4 but showing the stop means in the lower position thereof wherein it has been removed from the path of the line of packages;

FIG. 6 is a fragmentary elevational view of a detail looking in the direction of the arrows 6—6 in FIG. 2;

FIG. 7 is an elevational view of a mechanism for operating the stop-means-actuating device looking toward the right from the left-hand end of FIG. 2, and showing the stop means in its upper position;

FIG. 8 is a schematic illustration of certain of the parts of FIG. 7 showing one form of the operating mechanism for moving the stop means downwardly and showing the stop means out of the path of the packages;

FIG. 9 is a view similar to FIG. 8 but showing the stop means released for return to its "up" position, but not yet returned thereto because the leading package, although advancing, is still in the return path of the stop means and prevents its complete return;

FIG. 10 is a view similar to FIGS. 8 and 9, but showing the operating mechanism in an intermediate position;

FIG. 11 is a schematic illustration of a plurality of packages of random lengths moving on a conveyor wherein the leading package has just reached the stop member;

FIG. 12 is a view similar to FIG. 11, but showing the leading package after it has moved the stop means through a predetermined distance to the operative position thereof, and showing the actuating mechanism for the stop means on its way down;

FIG. 13 is a view similar to FIG. 12, but showing the actuating mechanism and stop means all the way down and out of the path of the packages, and the leading package moving over the stop means in its advancement toward its station;

FIG. 14 is a view similar to FIGS. 11–13 showing the actuating mechanism for the stop means returned to its "up" position, but the stop means only part way up because of the presence of the leading package against which the stop means is yieldably urged;

FIG. 15 is a view similar to FIGS. 11–14 showing the stop means returned to its "up" position immediately upon sensing the trailing edge of the leading package, and FIG. 16 is a view similar to FIG. 13, but showing an alternative form of mechanism for operating the actuating mechanism for the stop means.

DETAILED DESCRIPTION

Referring now more particularly to the drawings and especially to FIGS. 1, 2 and 3, the indexing apparatus is used in conjunction with a conveyor and the entire assembly is indicated generally in FIG. 1 by the numeral 1. The assembly includes as a part thereof, spaced side frame members 2 and 3 which are adapted to have loosely mounted therebetween a series of rollers 4. One or more lightweight packages P are placed upon the conveyor and are caused to move by rotation of the rollers 4 toward a stop member, generally indicated by the numeral 5, which is interposed normally in the path of movement of the packages along the conveyor.

These packages will move along the conveyor in a line in contact with each other so that the leading package in the line will come against the stop member 5. As will be pointed out in greater detail hereinafter, this stop means is caused to move out of the path of the moving packages periodically upon demand and when a package is present, whereupon supplemental drive means will cause the leading package to move toward its station at an increased rate of speed, thereby separating the leading package from the next-succeeding package and allowing the stop means to return.

Immediately preceding the stop member, 5, there is provided one or more rollers 6 which preferably have friction means, such as the "O" rings 6a, and which, as will be seen presently, are adapted to advance the leading package rapidly as soon as the stop means 5 has been moved out of the way. At the opposite side of the stop means 5 there is provided a plurality of additional rollers 7 which also act to advance the leading package to its station. The rollers 6 and the rollers 7 are all positively driven by a suitable drive means so as to advance the leading package more rapidly. As will appear more fully hereinafter, the stop member will remain out of the path of the packages until the trailing edge of the leading package has passed it, and thus the timing depends upon the length of the package.

The leading package in the line will be advanced to a station on a table or platform 8 at which station an operation may be performed thereon. As far as the present invention is concerned, it is immaterial as to what that operation is. It may be removed by hand or may be transferred to another station, either mechanically or by hand, but for purposes of illustration the invention has been shown in combination with a pusher member 9. This pusher is operated in timed relation with movement of the leading package to the station, so that the package will have reached its station in time for the pusher to move it in a transverse direction to a second station. In actual practice the indexing apparatus of the present invention has been used in conjunction with a wrapping machine such as disclosed in my U.S. Pat. No. 3,486,294. The pusher member 9 will transfer the leading package from its station to the next station where the wrapping operation is to begin.

Operating means, generally indicated by the numeral 10 (FIG. 3), are actuated periodically upon demand to move the stop means out of the path of the line of packages when a package is in position against the stop means 5.

Actuating means, generally indicated by the numeral 11, are caused to actuate the aforesaid operating means 10 in timed relation with movement of the pusher member 9, all as will presently be seen.

The drive means for operating the conveyor include a motor 12, which drives a sprocket 13 around which passes a sprocket chain 14. Such chain also passes around a sprocket 15 mounted on shaft 16. Another sprocket 17 is also mounted on shaft 16 and is driven by the motor through sprocket 15.

A sprocket chain 18 passes around sprocket 17 and a second sprocket mounted on the end of a shaft 19, thereupon causing rotation of said latter shaft. Another sprocket 20 is mounted on shaft 19 which drives a chain passing around a second sprocket mounted on the stub shaft 22. This latter shaft has a pulley 23 mounted thereon, and rotation thereof drives a belt 24 which also passes around a second pulley 25, mounted on shaft 26. This belt 24 drives the rollers 4 by frictional contact therewith.

It is one of the features of the present invention that the rollers 4 are loosely mounted in their bearings so as to rest on the upper surface of the drive belt 24, whereby movement of the belt will cause a rotation of such rollers. When packages are placed upon the rollers 4, the weight thereof will cause pressure between the rollers and the belt and thereby drive the rollers.

This feature is advantageous when the line of packages are caused to stop temporarily by reason of the leading package bearing against the stop means 5. If there were a positive drive means moving the packages they would tend to climb over each other when the lead package was stopped. The friction drive, as just described, permits the rollers to slip on the belt drive when the packages are not moving and thus the line will be maintained.

Another sprocket 27 is mounted on one end of shaft 19 and drives a sprocket chain 28 which passes around a second sprocket 29 mounted on the shaft 30. This arrangement may be seen in FIG. 2 and reference will now be made to FIG. 1 for an understanding of the manner in which this drive means operates the rollers 6 and 7. The shaft 30 has a gear 31 mounted thereon, which meshes with and drives a gear train 32, causing rotation of the rollers 6, and a second gear train 33, which causes rotation of the rollers 7 in the proper direction for advancing a package to its station on the table 8.

The stop means generally indicated at 5 is illustrated herein as consisting of a gate 34 pivotally mounted by means of the rod 34a (see FIG. 3) between the spaced gate arms 35 and 36. These latter arms are welded or other wise secured at one end thereof to mounting blocks 37 and 38 which, in turn, are mounted for rotation on a cross-shaft 39.

The shaft 39 is suitably mounted between frame members 40 and 41, welded or otherwise secured to the rigid cross-member 42. It will thus be evident at this point that when the operating means 10, presently to be described, is actuated by the actuating means 11 to raise and lower the gate 34, it will also cause a rotative movement of the gate arms 35 and 36. The gate 34 is normally, but yieldably, retained in its upper position by means of a tension spring 43 mounted at its lower end to a suitable part of the apparatus frame, such as the angle member 44, and at its upper end to an angle member 45 secured to the mounting block 36. The spring 43 has a downward pull, thereby elevating the gate arms 35 and 36 on which the gate 34 is mounted.

It will be evident that the gate could be mounted to move upwardly or to one side, rather than downwardly to be removed from the path of the packages. In any event, as soon as it is moved out of the path against the spring force, it is promptly released and the spring will urge the gate against the leading package as it is being advanced. The tension of the spring is adjusted so that the force of the gate against the package is insufficient to restrict forward movement of the package, by its conveying means. For packages weighing only a few ounces, a relatively light spring may be used. Also, rollers 34b on the gate minimize friction and facilitate movement of the package.

In order to prevent inadvertent lowering of the gate 34 and gate arms 35 and 36, there is provided a gate arm latch 46 pivotally mounted to a suitable part of the frame as at 47 (see FIGS. 3, 4 and 5). A tension spring 48 secured at one end to the latch at 49 and at its other end to a part of the frame as at 50, normally urges the latch 46 to a position as shown in FIG. 4 where the upper inclined edge thereof is positioned immediately below the gate arm 35. As will presently be seen, when the apparatus is to be actuated in the normal operation thereof, the latch 46 will be cammed away from its locking position to the position shown in FIG. 5, thereby enabling the gate arms 35 and 36 and the gate 34 to be moved to the "-down" position thereof and allow a package to move over the gate to its station.

While it will be understood that any suitable means may be provided for moving the gate 34 downwardly, the specific operating means shown herein for purposes of illustration and which has been generally identified by the numeral 10, includes a downwardly extending tail member 51 secured to the gate 34 which terminates at its lower end in a lip 52. An operating finger 53 is secured to one end of a finger arm 54 which is integral with, or rigidly secured to, a mounting block 55 adjacent the opposite end thereof. The block 55 is mounted for rotation on the shaft 39 and has a plate 56 extending downwardly therefrom. A tension spring 57 is suitably mounted between the lower end of the plate 56 and a rigid part of the frame, thereby to maintain the finger arm 54 and the operating finger connected thereto in a normally upper position.

A latch release plate 58 is mounted on the finger arm 54 and is adapted to move the latch 46 in a clockwise direction as viewed in FIGS. 4 and 5, to release the latch and enable the arms to move downwardly. The actuating mechanism for these various parts will be described presently, but for the moment it will be evident that when the finger arm 54 is caused to move downwardly, it will carry with it the latch release plate 58 which will move against the inclined edge of the latch 46 to rotate the latch out of the path of the gate arm 35 as illustrated in FIGS. 4 and 5.

The illustrated operating mechanism which moves the finger arm 54 downwardly includes a link 59 pivotally mounted at 60 to the finger arm 54 adjacent one end thereof. This link extends downwardly and is pivotally connected at 61 to a channel-shaped elongated link 62. This latter link, as may be seen in FIGS. 2 and 3, extends downwardly and rearwardly and is mounted for rotation on the shaft 39. The rear end of the link 62 extends rearwardly for a short distance beyond the shaft 39 and receives a roller member 63 between the sides thereof. The roller is mounted on the rear end of a bar 64 which extends forwardly. A shaft 66 rotatably supports a collar 65 as well as the bar 64. The forward end of the bar 64 has secured thereto an adjustment member consisting of a screw 67 passing through a flange 68 and secured in place by a locknut 69.

A cam rod 70 is mounted for reciprocating movement in an upward and downward direction and is located forwardly of the gate 34. The cam rod 70 is secured to the forward end of an arm 71 which extends rearwardly and is welded or otherwise secured to the rotatable coller 65. Thus, when the cam rod 70 is caused to move up or down it carries with it the arm 71 and rotates the collar 65 on shaft 66. This arm 71, when moving downwardly, also contacts the upper end of the screw 67 and thereby moves the forward end of the bar 64 downwardly and its rear end upwardly. Viewing FIG. 3 again it will thus be evident that when the rear end of the bar 64 moves upwardly it carries with it the roller 63 and the outer free end of the channel-shaped link 62. This will then cause the forward end of link 62 to move downwardly carrying with it the link 59 and finger arm 54. The initial movement downwardly of the arm 54 will cause the latch release plate 58 to cam the latch 46 away from its locking position so that continued movement thereof will permit the gate arms 35 and 36 to move downwardly when the finger 53 on finger arm 54 contacts the lip 52 of the tailpiece 51, thereby moving the gate 34 to its lower position.

The actuating means to move the cam rod 70 and the arm 71 upwardly and downwardly may comprise any suitable device which will operate in timed relation with movement of the packages and movement of the transverse pusher. In the present disclosure, however, the cam rod is actuated by means of a roller 72 (see FIGS. 2 and 6-10) which is caused to reciprocate transversely of the conveyor.

In accordance with the disclosure herein, the roller 72 is caused to reciprocate by being connected to the pusher 9. The mechanism for reciprocating the pusher 9 forms no part of the present invention and is fully disclosed in my above-referred-to patent. It is sufficient for present purposes to note that the roller 72 is fixed to a carriage 73 to which the pusher 9 is attached. This assembly reciprocates along a guide rod 74.

A link 75 is connected at one end to the carriage 73 and at its other end is pivotally connected at 76 to one arm 77 of a bellcrank lever. This lever is pivoted at 78 and has its other arm 79 secured to a rod 80. Suitable drive mechanism reciprocates the rod 80 and, in turn, reciprocates the pusher 9 through the bellcrank lever and the link 75.

The cam rod 70 is bent substantially as shown in FIGS. 7 to 10 inclusive. The position of the various parts shown in FIG. 7 corresponds to those positions of FIGS. 2 and 3. At this point the pusher 9 has just transferred a package from its station. When the pusher then returns to the position shown in FIG. 1, the roller 72 will move toward the right as viewed in FIGS. 7 through 10 and will cause the cam rod 70 to move downwardly to the position shown in FIG. 8 When this occurs, the operation above described will take place wherein the arm 71 moves down to move the bar 64 upwardly thereby moving the gate 34 downwardly, if there is a package present at the gate. When a package is present, thereby pivoting the gate to a position where the tail 51 thereof is in the path of movement of the finger 53, it will be moved downwardly. If no packages are present, then the gate will remain in its normal upward position with the tail 51 out of the path of movement of the finger 53 whereby it may move up and down as a result of the reciprocation of the pusher without moving the gate.

If a package is present at the gate when the pusher returns to its position shown in FIG. 1, the gate will have been lowered and the rapid rotation of the rollers 6 and 7 will advance the leading package more rapidly to its station in front of the pusher. When this occurs there will be a space created between the leading package and the next-preceding one thereby enabling the gate to be returned upwardly to its normal position upon movement of the pusher and the roller 72 to the position shown in FIG. 2. As soon as the roller 72 has moved past the end of the cam rod 70 as shown in FIG. 9, the spring 57 will return the finger arm 54, finger 53, and its connected parts to their upper position. At this time, however, the leading package will not yet have passed beyond the gate, so, although the spring 43 will act to return the gate to its uppermost position, nevertheless it will be stopped in this movement by coming against the package. Thus the gate will be stopped temporarily by the package on its return to its normal position, but the pressure which it exerts against the package will not affect the normal advancement of the package by its conveyor, and the rollers 34b will minimize any friction. The gate will remain down as long as the package is present and until it has moved past the gate. The spring-loaded gate will sense the trailing edge of the package and immediately will return all the way to its normal position in front of the next-succeeding package.

When the pusher is advanced, the roller 72 will again move toward the left as viewed in FIGS. 7-10, wherein FIG. 10 shows the roller in an intermediate position. All parts will be in a position to repeat the cycle after the roller 72 has reached its advanced position shown in FIG. 7. To facilitate an understanding of this sequence of operations, the letter x has been used in FIGS. 7 through 10 to indicate the constant distance between the roller 72 and the bottom of a package P, both of which always remain in the same horizontal plane, while the moving parts are shown in their different positions relative thereto.

FIGS. 11 through 15 illustrate schematically the movement of the packages and the relative positions of the gate 34 and finger 53 during a cycle. FIG. 11 illustrates a line of three packages in contact with each other as the first or leading package initially contacts the gate 34. To illustrate the adaptability of the invention to various size packages, these figures show the packages in random lengths. Due to movement of the rollers 4 and 6 the packages will move against the gate and rotate it to the position shown in FIG. 12. The packages will stay in this position and the rollers will slip until there is a demand for a package. In this case the demand is made when pusher 9 and its roller 72 are returned to the initial position thereof shown in FIG. 1 and in FIG. 9. During this movement the gate will be lowered to the position shown in FIG. 13 whereupon the first or leading package will be advanced rapidly by the driven rollers 6 and 7 to the station in front of the pusher.

As above explained, as soon as the roller 72 has passed the end of the cam rod 70 on its way to the position shown in FIG. 9, the finger 53 will return to its uppermost position as in FIGS. 3 and 14. The gate 34 will also begin its return to its normal position but in so doing it will come against the leading package, as shown in FIG. 14, where it will remain until it senses the trailing edge of the package and immediately continues its return toward its normal position as shown in FIG. 15.

Thus, it will be evident that two things are necessary for delivery of a package to the station. There must be a demand for a package, and there must be a package present at the gate. In the absence of either, no package will be delivered.

The demand for a package may be made mechanically, electrically, or manually. In the illustrated structure it is made mechanically when the pusher returns to its normal position, as explained above. In the absence of such pusher the operating mechanism 10 could be actuated manually by an operator, or a demand could be made mechanically or manually by closing an electrical circuit to actuate the operating mechanism by means such as a solenoid.

FIG. 16 represents an alternative form of actuating device for the finger 53 wherein the armature 81 of a solenoid 82 is connected by a link 83 to the finger arm 54. When the solenoid is energized it will move downwardly and carry with it the finger 53 and gate 34 if a package is present.

Any suitable and well-known means can be used for energizing the solenoid upon demand for a package. For example when the presence of a package is sensed by the gate, and it rotates, it could close a circuit to the solenoid 82 which would momentarily energize it and pull down finger 53 and gate 34 to allow the leading package to advance.

Movement of the carriage 73 and roller 72 could close a circuit to the solenoid for the same result instead of actuating the finger mechanically, or the circuit could be closed manually, or by an electric eye sensing the leading edge of the package.

The sensing of the leading and trailing edges of the package for moving the gate out of the path of the packages and then for returning it to normal position, may also be accomplished in a number of specifically different ways, either mechanically or electrically. In the illustrative embodiment the gate senses the leading edge by moving. Electrically, an eye could sense the leading edge and ready a circuit for removing the gate when there is a demand.

Likewise, in the present embodiment, the means for sensing the trailing edge of the package is the spring-loaded gate which is returned to its normal position immediately upon movement of the trailing edge past the gate. Electrically, an eye could sense the trailing edge, or a switch could open the circuit to move the gate as soon as the trailing edge had passed it.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. Indexing apparatus for conveying packages one at a time from a line of packages to a station where an operation is to be performed thereon, comprising,
   a. conveyor means for moving packages in a direction toward the said station,
   b. movable stop means having a normal position in the path of movement of the packages and against which the leading package in the line is adapted to be moved by said conveyor,
   c. means mounting said stop means for an initial movement through a predetermined distance under pressure of the leading package being moved thereagainst, said initial movement being in the same direction as movement of the package, so that upon completion of said initial movement said stop means will still be in the path of movement of the package,
   d. means, operable when the leading package and said stop means have been moved through said predetermined distance, to move said stop means out of the path of movement of the package,
   e. means for separating the leading package from the next-succeeding package upon movement of said stop means out of the path of the package, and for moving the package to the station, and
   f. means to return said stop means to the said normal position thereof in the path of the next-succeeding package.

2. The combination of elements defined in claim 1, wherein said means to move said stop means out of the path of movement of the packages includes a cyclically operating mechanism.

3. The combination of elements defined in claim 1, wherein said movable stop means includes a gate extending above said conveyor means, and means pivotally mounting said gate for rotating movement when the leading package is moved thereagainst.

4. The combination of elements defined in claim 1, wherein said last-named means includes a yieldable member normally urging said stop means to said normal position thereof.

5. The combination of elements defined in claim 1., wherein said means to separate the leading package from the next-succeeding package includes mechanism for moving the leading package at an increased speed to the said station.

6. The combination of elements defined in claim 5, wherein said mechanism for moving the leading package at an increased speed to the said station includes at least one roller positioned in front of said stop means having friction means thereon over which the leading package is adapted to move in contact therewith, and positive drive means for driving said roller at a speed greater than the speed at which said conveyor moves the line of packages.

7. Indexing apparatus for conveying packages one at a time from a line of packages to a station, comprising,
 a. conveyor means for moving packages in a direction toward the said station,
 b. a movable gate member normally positioned in the path of movement of the packages on the conveyor and against which the leading package is moved by the conveyor,
 c. means to sense the presence of the leading edge of the leading package and to ready said gate for movement out of the path of the packages,
 d. means for moving said gate out of the path of movement of the leading package, and
 e. means to sense the presence of the trailing edge of the leading package, and operable to return said gate to the said normal position thereof in the path of the next-succeeding package.

8. The combination of elements defined in claim 7, wherein the means recited in paragraph (c) thereof includes a pivotal mounting for said gate, whereby pressure of the leading package against said gate rotates the gate to a position where actuation of the means for moving said gate out of the path of movement of the package will be effective to so move said gate.

9. The combination of elements defined in claim 7, wherein the means recited in paragraph (e) thereof includes spring-loading means for said gate urging the gate against the leading package and returning said gate to the said normal position thereof immediately upon movement of the said trailing edge past said gate.

10. The combination of elements defined in claim 7, wherein the means recited in paragraph (c) thereof includes an electrical circuit, and the means recited in paragraph (d) thereof includes a solenoid connected to said gate operable upon completion of said circuit.

11. Indexing apparatus for conveying packages one at a time from a line of packages to a station, comprising,
 a. conveyor means for moving packages in a direction toward the said station,
 b. stop means normally positioned in the path of movement of the packages, and against which the leading package in the line may be moved, but movable out of the said path upon demand and when a package is present, to allow the leading package to advance past said stop means to the said station,
 c. means operable to move said stop means out of the path of the leading package only when
  1. a package is present against the stop means, and
  2. a demand signal is given whereupon the leading package is advanced to said station,
 d. electrical means for sensing the leading edge of the leading package and giving a demand signal, and
 e. means to return said stop means to said normal position thereof in the path of movement of the next-succeeding package.

12. Indexing apparatus for conveying packages one at a time from a line of packages to a station where an operation is to be performed thereon, comprising,
 a. conveyor means for moving packages in a direction toward the said station,
 b. movable stop means having a normal position in the path of movement of the packages and against which the leading package in the line is adapted to be moved by said conveyor,
 c. means mounting said stop means for movement through a predetermined distance under pressure of the leading package being moved thereagainst,
 d. cyclically operating mechanism operable when the leading package and said stop means have been moved through said predetermined distance, to move said stop means out of the path of movement of the package, said cyclically operating mechanism including
  1. a finger,
  2. means to reciprocate said finger in timed relation with performance of operation on the package at said station, and
  3. means on said stop means to intercept said finger and move therewith in one direction of the reciprocation thereof,
 e. means for separating the leading package from the next-succeeding package upon movement of said stop means out of the path of the package, and for moving the package to the station, and
 f. means to return said stop means to the said normal position thereof in the path of the next-succeeding package.

13. Indexing apparatus for conveying packages one at a time from a line of packages to a station where an operation is to be performed thereon, comprising,
 a. conveyor means for moving packages in a direction toward the said station,
 b. movable stop means having a normal position in the path of movement of the packages and against which the leading package in the line is adapted to be moved by said conveyor, said movable stop means including
  1. a gate extending above said conveyor means, and
  2. means pivotally mounting said gate for rotating movement when the leading package is moved thereagainst,
 c. means mounting said stop means for movement through a predetermined distance under pressure of the leading package being moved thereagainst,
 d. a reciprocable member operable when said gate has been rotated under pressure of the leading package, to move said gate downwardly out of the path of movement of the package,
 e. means for separating the leading package from the next-succeeding package upon movement of said stop means out of the path of the package, and for moving the package to the station, and
 f. means to return said stop means to the said normal position thereof in the path of the next-succeeding package.

14. Indexing apparatus for conveying packages one at a time from a line of packages to a station, comprising,
 a. conveyor means for moving packages in a direction toward the said station,
 b. a pivotally mounted gate member normally positioned in the path of movement of the packages and rotatable through a predetermined distance under pressure of the leading package, but movable out of the said path upon demand and when a package is present, to allow the leading package to advance past said gate to the said station,
 c. a reciprocable member operable to move said gate downwardly out of the path of the leading package only when
  1. a package is present against the gate, and
  2. a demand signal is given whereupon the leading packages advance to said station, said gate being movable downwardly in response to the demand signal only when it has been rotated through said predetermined distance,
 d. means for giving a demand signal, and
 e. means to return said stop means to said normal position thereof in the path of movement of the next-succeeding package.

15. The combination of elements defined in claim 14, wherein said means for giving a demand signal comprises a second reciprocable member adapted to actuate said first-named reciprocable member when said second reciprocable member moves in one direction.

16. The combination of elements defined in claim 14, wherein said means for giving a demand signal includes a solenoid connected to said reciprocable member, and an electrical circuit which, when completed, actuates said solenoid.

17. Indexing apparatus for conveying packages one at a time from a line of packages to a station where an operation is to be performed thereon, comprising,
   a. conveyor means for moving packages in a direction toward the said station,
   b. movable stop means having a normal position in the path of movement of the packages and against which the leading package in the line is adapted to be moved by said conveyor,
   c. means mounting said stop means for movement through a predetermined distance under pressure of the leading package being moved thereagainst,
   d. means, operable when the leading package and said stop means have been moved through said predetermined distance, to move said stop means out of the path of movement of the package,
   e. means for separating the leading package from the next-succeeding package upon movement of said stop means out of the path of the package, and for moving the package to the station,
   f. means to return said stop means to the said normal position thereof in the path of the next-succeeding package,
   g. latch means to prevent inadvertent movement of said stop means out of the path of the packages, and
   h. means to render said latch means ineffective upon actuation of said means to move said stop means out of the path of movement of the packages.

* * * * *